UNITED STATES PATENT OFFICE.

MAX BURCHARDT, OF MOUNT VERNON, NEW YORK.

IMPROVEMENT IN ANTISEPTIC AND DEODORIZING COMPOUNDS.

Specification forming part of Letters Patent No. 222,451, dated December 9, 1879; application filed October 9, 1879.

*To all whom it may concern:*

Be it known that I, MAX BURCHARDT, of Mount Vernon, in the county of Westchester and State of New York, have invented a new and Improved Antiseptic and Deodorizing Compound, which invention is fully set forth in the following specification.

This invention relates to an antiseptic and deodorizing liquid composed of chloride of calcium, alcohol, and water, mixed together in about the proportions hereinafter set forth.

Many of the antiseptic compounds now in use prove very efficient in preserving animal refuse matter and other bodies liable to decomposition, provided the same are exposed to the influence of the antiseptic before they have begun to decompose. In many cases, however, the refuse matter has already begun to decompose before any antiseptic is applied to it, as, for example, in urinals, sinks, and the like.

In preparing this antiseptic liquid my object has been to provide a material which would not only prevent the decomposition of refuse matter, but which would also destroy the odors and noxious gases arising from bodies which have already undergone a partial decomposition.

For this purpose I provide a mixture of chloride of calcium, alcohol, and water, employing about the following proportions of said ingredients, viz: Ten parts of chloride of calcium, fifteen parts of alcohol, and seventy-five parts of water.

Of course I do not limit myself to the precise proportions set forth; but I find the best results are obtained by using substantially such proportions.

This compound has the advantage that it can be prepared rapidly and at little expense, since the ingredients can readily be obtained, and it is very effective in destroying the noxious odors of partially-decomposed bodies, or those arising from bilge-water in ships and the like, and in arresting decomposition.

Another great advantage derived from my compound is that the same, when added to urine, prevents the formation of uric acid, and consequently the evolution of ill-smelling gases, such as ammonia, &c. My compound is also of great value as a prevention of the formation of gravel in the bladder, and my experiments show that it dissolves gravel already formed.

What I claim as new, and desire to secure by Letters Patent, is—

The composition of matter above described, composed of chloride of calcium, alcohol, and water, mixed together in about the proportions hereinbefore set forth.

In testimony that I claim the foregoing I have hereunto set my hand and seal this 9th day of August, 1879.

MAX BURCHARDT. [L. S.]

Witnesses:
  E. F. KASTENHUBER,
  J. VAN SANTVOORD.